(12) United States Patent
Tani et al.

(10) Patent No.: US 9,227,356 B2
(45) Date of Patent: Jan. 5, 2016

(54) ENGAGEMENT STRUCTURE BETWEEN A MOUTH MEMBER OF A PRESSURE VESSEL AND A BLOW PIN, MOUTH MEMBER STRUCTURE OF A PRESSURE VESSEL HAVING THE ENGAGEMENT STRUCTURE AND METHOD OF MAKING A PRESSURE VESSEL

(75) Inventors: Tatsushi Tani, Sakura (JP); Jun Ohashi, Sakura (JP); Masahiro Tashiro, Sakura (JP)

(73) Assignee: Yachiyo Industry Co., Ltd., Sayama-shi (JP)

( * ) Notice: Subject to any disclaimer, the term of this patent is extended or adjusted under 35 U.S.C. 154(b) by 503 days.

(21) Appl. No.: 13/261,505

(22) PCT Filed: May 12, 2011

(86) PCT No.: PCT/JP2011/002647
§ 371 (c)(1),
(2), (4) Date: Nov. 5, 2012

(87) PCT Pub. No.: WO2011/145300
PCT Pub. Date: Nov. 24, 2011

(65) Prior Publication Data
US 2013/0049256 A1    Feb. 28, 2013

(30) Foreign Application Priority Data

May 19, 2010    (JP) .................................. 2010-115173

(51) Int. Cl.
*F17C 1/02*    (2006.01)
*F17C 1/16*    (2006.01)
(Continued)

(52) U.S. Cl.
CPC ................ *B29C 49/20* (2013.01); *B29C 49/24* (2013.01); *F17C 1/06* (2013.01); *F17C 1/16* (2013.01);
(Continued)

(58) Field of Classification Search
CPC ............... B29C 2049/2404; B29C 2049/2443; B29C 2049/2481; B29C 49/26; B29C 49/24; B29L 2031/7172
USPC .................................. 264/249; 425/522, 533
See application file for complete search history.

(56) References Cited

U.S. PATENT DOCUMENTS 6,227,402 B1   5/2001   Shimojima et al.
7,861,887 B2   1/2011   Ota et al.

FOREIGN PATENT DOCUMENTS

DE         3518506 A1   11/1986
JP         3-59818 B2    9/1991
(Continued)

*Primary Examiner* — Alison Hindenlang
*Assistant Examiner* — Mohamed K Ahmed Ali
(74) *Attorney, Agent, or Firm* — Marshall & Melhorn, LLC

(57) ABSTRACT

In a pressure vessel which is formed by blow molding a plastic liner with a mouth member fitted on a blow pin, a rotational torque is prevented from being applied between the mouth member and the blow pin when removing the blow pin. A parison is placed around the mouth member which is fitted on the blow pin, and is blow molded with a die assembly placed around the parison so that a vessel shaped plastic liner is formed. An engagement structure which is provided between the mouth member of the pressure vessel and the blow pin includes a ball moveably received in a radial through hole of the peripheral wall of the blow pin, and a release groove formed on an inner circumferential surface of the mouth member and having a prescribed depth. When the blow pin is introduced into the mouth member until the ball and the release groove oppose each other, the ball moves radially outward and becomes partly received by the release groove to engage the mouth member with the blow pin.

6 Claims, 4 Drawing Sheets

(51) Int. Cl.
  B29C 49/06 (2006.01)
  B29C 49/20 (2006.01)
  F17C 1/06 (2006.01)
  B29C 49/24 (2006.01)
  B29C 49/04 (2006.01)
  B29L 31/00 (2006.01)

(52) U.S. Cl.
  CPC ......... *B29C 49/04* (2013.01); *B29C 2049/2008* (2013.01); *B29C 2049/2047* (2013.01); *B29C 2049/2078* (2013.01); *B29C 2049/2404* (2013.01); *B29C 2049/2443* (2013.01); *B29L 2031/7172* (2013.01); *F17C 2201/0109* (2013.01); *F17C 2201/056* (2013.01); *F17C 2203/0604* (2013.01); *F17C 2203/066* (2013.01); *F17C 2203/067* (2013.01); *F17C 2203/0619* (2013.01); *F17C 2203/0636* (2013.01); *F17C 2203/0665* (2013.01); *F17C 2203/0668* (2013.01); *F17C 2209/2127* (2013.01); *F17C 2209/227* (2013.01); *F17C 2209/234* (2013.01); *F17C 2221/035* (2013.01); *F17C 2223/036* (2013.01)

(56) References Cited

FOREIGN PATENT DOCUMENTS

| JP | 10-14159 A | 1/1998 |
| JP | 10-332082 A | 12/1998 |
| JP | 2000-291888 A | 10/2000 |
| JP | 2003-251685 A | 9/2003 |
| JP | 2006-161978 A | 6/2006 |
| JP | 2008-12720 A | 1/2008 |
| JP | 2008-164112 A | 7/2008 |
| JP | 2008-164113 A | 7/2008 |
| JP | 2008-256151 A | 10/2008 |
| WO | WO2009135453 A2 * | 11/2009 |
| WO | WO2009156524 A1 * | 12/2009 |

* cited by examiner

ENGAGEMENT STRUCTURE BETWEEN A MOUTH MEMBER OF A PRESSURE VESSEL AND A BLOW PIN, MOUTH MEMBER STRUCTURE OF A PRESSURE VESSEL HAVING THE ENGAGEMENT STRUCTURE AND METHOD OF MAKING A PRESSURE VESSEL

TECHNICAL FIELD

The present invention relates to an engagement structure between a mouth member of a pressure vessel for storing compressed gas such as liquefied petroleum gas (LPG) and a blow pin, and a seal structure for such a pressure vessel.

BACKGROUND OF THE INVENTION

LPG contributes to the prevention of acid rain because of a low sulfur content thereof, and the burned gas contains a relatively small amount of $CO_2$ as compared with petroleum and coal. Therefore, LNG is considered as an ecological, clean energy source. LNG can be liquefied under a relatively low pressure, and the liquefied volume thereof is a 250th of the original gas volume. Furthermore, LNG can be stored and transported in a tank which is capable of withstanding a relatively low pressure. Currently, steel pressure vessels are commonly used for storing and transporting LNG in Japan, but light weight pressure vessels made of composite materials based on plastic technology are widely used in western countries. The composite pressure vessel typically comprises a plastic liner, a fiber reinforced plastic layer (FRP layer) reinforcing the outer surface of the plastic liner and a metallic mouth member that protrudes outward from the FRP layer and defines an opening for introducing and expelling LPG into and out of the pressure vessel.

The LPG pressure vessel made of steel for home use is required to withstand the pressure of 3 MPa (30.59 kgf/cm2), and to be free from any LNG leakage at this pressure. In a composite pressure vessel, the metallic mouth member is required to be bonded to the plastic liner or to the FRP layer, and various proposals have been made to prevent leakage from the bonding interface (See Patent Documents 1 and 2, for instance).

The prior inventions disclosed in these patent documents feature special physical configurations of the plastic liner and the mouth member. However, the bonding between plastic and metal parts involves some difficulty. It often is the case that leakage can be prevented when the internal pressure of the vessel is relatively high, but some leakage occurs when the interval pressure is low.

PRIOR ART DOCUMENT(S)

Patent Document(s)

Patent Document 1: JP 3523802B
Patent Document 2: JP 2008-256151A
Patent Document 3: JP 2008-164112A

SUMMARY OF THE INVENTION

Task to be Accomplished by the Invention

The technology disclosed in Patent Document 3 consists of forming a plastic liner by blow molding with a mouth member inserted thereof, and this does not easily allow the state of bonding between the coating on the surface of the mouth member and the plastic liner to be verified upon completion of the molding process.

Also, in the conventional blow molding process, a screw blow pin was used for the purpose of engaging the mouth member with the blow pin. According to such a structure, when removing the blow pin upon completion of the molding process, the rotational load that is applied to the mouth member adversely affects the state of bonding between the mouth member and the plastic liner so that the reduction in the bonding strength and the creation of cracks in the bonding interface could not be easily prevented.

In view of such problems of the prior art, a primary object of the present invention is to provide, with respect to a pressure vessel including a plastic liner which is blow molded with a mouth member inserted therein, an engagement structure to be provided between the mouth member of the pressure vessel and a blow pin which prevents any rotational load to be applied to the bonding interface between the mouth member and the plastic liner when removing the blow pin, a mouth member structure of a pressure vessel having such an engagement structure and a method of making such a pressure vessel.

Means to Accomplish the Task

The present invention provides an engagement structure provided between a mouth member (4) of a pressure vessel (1) and a blow pin (11), wherein a parison (12) is placed around the mouth member with the blow pin received in the mouth member, and is blow molded by using a die assembly (13) surrounding the parison so that a plastic liner (2) of a pressure vessel is formed along a die surface of the die assembly as a vessel-like structure. The engagement structure comprises a through hole (21) passed through a peripheral wall of the blow pin; a ball (22) received in the through hole so as to be moveable in a radial direction; and a recess (20) formed in an inner circumferential surface of the mouth member; wherein when the blow pin is received in the mouth member so as to cause the ball to oppose the recess, the mouth member and the blow pin are engaged with each other by the ball moving radially outward until a part of the ball is received in the recess.

According to this structure, the engagement between the blow pin and the mouth member can be realized by a quick joint so that the engagement and disengagement between the blow pin and the mouth member can be facilitated, and the rotational load that may be otherwise applied to the mouth member when removing the blow pin is prevented from adversely affecting the state of bonding between the mouth member and the plastic liner.

According to a certain aspect of the present invention, the engagement structure further comprises: a large diameter tubular member (26) having a vertically extending axial line and defining the peripheral wall of the blow pin; a small diameter tubular member (23) received in the large diameter tubular member in a vertically moveable manner; and a biasing means (25) for resiliently urging the small diameter tubular member in a first axial direction (upward); wherein the outer periphery of the small diameter tubular member includes a large diameter portion (29) formed on a side of a second axial direction (downward direction) thereof, the second axial direction being opposite to the first axial direction, and a reduced diameter portion (24) formed on a side of the first axial direction thereof and connected to the large diameter portion via a tapered portion (28) so that a movement of the small diameter tubular member in the second axial direction (downward) allows a radially inward movement of the ball, and a movement of the small diameter tubular member in the first axial direction with the ball located in a radially inward position causes the ball to move radially outward owing to an engagement with the tapered portion, the large diameter portion, when disposed to oppose the ball, preventing a radially inward movement of the ball from a radially outward position thereof.

According to this structure, a quick joint coupler that allows the engagement between the blow pin and the mouth member and the locking of the engaged state to be automatically achieved by using a biasing force of a biasing means without complicating the overall structure.

According to a certain aspect of the mouth member structure for a pressure vessel provided with the engagement structure of the present invention discussed above, the mouth member comprises a metallic hat member including an annular flange (51) and a tubular portion (52) extending axially outward from an inner peripheral part of the flange and a plastic bonding member (6) insert molded around the flange and a part of the tubular portion into an annular shape, the plastic liner and the bonding member being bonded to each other as the plastic liner is blow molded with the mouth member inserted therein.

According to this arrangement, because the plastic liner is blow molded with the mouth member made of both plastic and metallic materials by inserting the metallic hat member inserted in the plastic material, the mouth member and plastic liner are bonded to each other by the welding to two plastic material parts so that a highly reliable bonding between them can be accomplished. Furthermore, the complex features such as dovetails are not required between the mouth member and the plastic liner in order to ensure a reliable bonding between them so that the flow mode of the molten plastic material is not required to be considered. In other words, the surface configurations of the bonding interface can be freely selected from those promoting the bonding between the two parts.

According to yet another aspect of the mouth member structure for a pressure vessel of the present invention, a powder coating (7) is applied to a surface of the hat member.

According to this arrangement, a highly secure engagement can be achieved between the metallic part and the plastic part by insert molding the metallic hat member in the plastic member. Furthermore, the state of bonding between the metallic part and the plastic part can be verified by inspecting the mouth member before being assemble to the plastic liner so that any defect can be discovered during an intermediate manufacturing step, and the productivity can be improved. Also, the flange of the hat member may be provided with through holes, and the flange and/or the tubular portion may be formed with a groove or a ridge so that rotation of the hat member relative to the bonding member may be prevented, and a self sealing property may be achieved between the hat member and the bonding member.

According to a certain aspect of a method of making a pressure vessel of the present invention having the engagement structure discussed above, the method comprises the steps of: preparing a metallic hat member (5) including an annular flange (51) and a tubular portion (52) extending axially outward from an inner peripheral part of the flange; forming a mouth member by injecting molding a plastic bonding member (6) around the flange and a part of the tubular portion of the hat member into an annular shape; fitting the mouth member onto a blow pin by using the engagement structure and inserting the mouth member in a die assembly; and bonding the plastic liner with the bonding member by blow molding the plastic liner with the mouth member inserted in the die assembly.

By thus blow molding the plastic liner with a mouth member inserted therein, and forming the mouth member by molding the bonding member with the metallic hat member insert molded therein, the mouth member and the plastic member are joined to each other by means of a welding between two plastic parts, and a highly reliable bonding can be achieved between the mouth member and the plastic liner.

According to another aspect of the method for making a pressure vessel according to the present invention, prior to injection molding the bonding member into the annular shape, a powder coating (7) is applied to a surface of the hat member in the step of forming the mouth member.

According to this arrangement, when forming the mouth member by inserting the metallic hat member in the plastic member, a highly reliable bonding can be achieved between the metallic part and the plastic part. Furthermore, the state of bonding between the metallic part and the plastic part can be verified by inspecting the mouth member before being assemble to the plastic liner so that any defect can be discovered during an intermediate manufacturing step, and the productivity can be improved.

According to another aspect of the method for making a pressure vessel according to the present invention, air having a temperature high enough to put the bonding member into a molten state is blown into a parison from an air supply hole of the blow pint when blow molding the plastic liner in the step of bonding the plastic liner with the bonding member.

When bonding the plastic liner with the bonding member, depending only on the latent heat of the parison may not result in a satisfactory welding because of insufficient melting of the parts to be bonded. According to this arrangement, the temperature of the mouth member can be adequately raised by heating the air supplied for the blow molding process to a prescribed temperature so that a reliable bonding not relying of the latent heat can be accomplished.

Effect of the Invention

The present invention provides, with respect to a pressure vessel including a plastic liner which is blow molded with a mouth member inserted therein, an engagement structure to be provided between the mouth member of the pressure vessel and a blow pin which prevents any rotational load to be applied to the bonding interface between the mouth member and the plastic liner when removing the blow pin, a mouth member structure of a pressure vessel having such an engagement structure and a method of making such a pressure vessel.

BRIEF DESCRIPTION OF THE SEVERAL VIEWS OF DRAWINGS

DETAILED DESCRIPTION OF THE INVENTION

Figure 1:
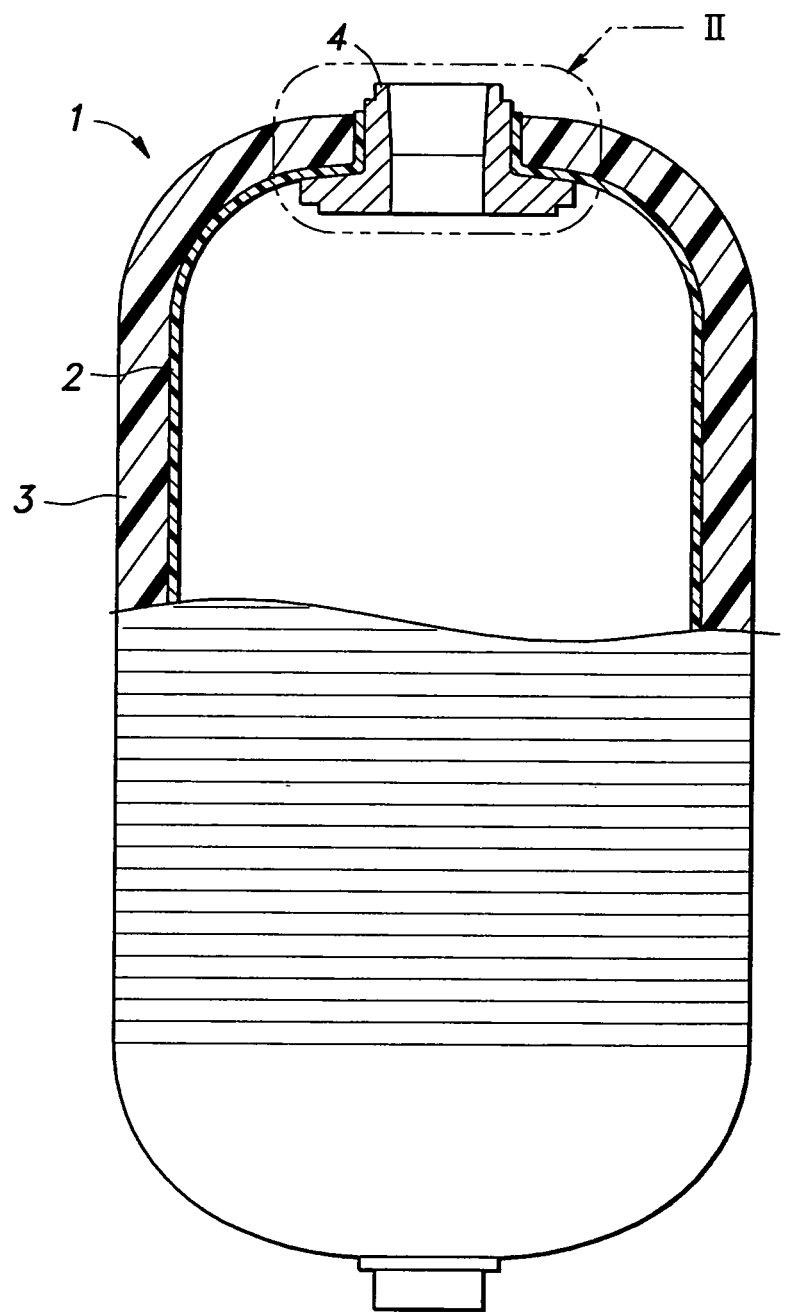
FIG. 1 is a side view of a pressure vessel embodying the present invention partly in section.

An example of a pressure vessel 1 to which the present invention is applied is described, and, then, an engagement structure between a mouth member 4 of the pressure vessel 1 and a blow pin 11, a mouth member structure of the pressure vessel 1 and a manufacturing method of the pressure vessel are described in the following. Referring to FIG. 1, the pressure vessel 1 comprises a plastic liner 2 for receiving primarily gas or liquid therein, a fiber reinforced plastic layer 3 reinforcing the outer surface of the plastic liner 2 and a mouth member 4 projecting out of the plastic liner 2 and the fiber reinforced plastic layer 3 for introducing and expelling air or gas into and out of the pressure vessel 1. The detailed bonding structure between the plastic liner 2 and the mouth member 4 is omitted in FIG. 1, and will be described in more detail hereinafter.

The plastic liner 2 constitutes a vessel for receiving gas or liquid, and can be made of material that suits the content and the condition under which the content is filled into the vessel. The typical materials for the plastic liner 2 include polyethylene (PE), high density polyethylene (HDPE), polyamide, polyketone and polyphenylene-sulfide (PPS), and the molding method may consist of a blow molding process and other molding processes. The blow molding process is used in the illustrated embodiment. Other possible molding processes include the rotational molding process.

The plastic liner 2 forms the basis for the shape of the completed pressure vessel, and is formed into a shape which allows the weight of the plastic liner 2 to be minimized under the intended high pressure condition. For instance, the plastic liner 2 may include a cylindrical main part and a pair of semi-spherical lids attached to the axial ends of the cylindrical main body as shown in FIG. 1, or may be formed into a spherical shape.

The mouth member 4 is first attached to the plastic liner 2, and reinforcement fibers impregnated with resin are then wrapped around the outer surfaces of the plastic liner 2 and the mouth member 4 by using a filament winding method. Alternatively, woven fabric impregnated with resin may be wrapped around the outer surfaces of the plastic liner 2 and the mouth member 4 by using a hand layup method.

The fiber reinforced plastic layer 3 thus consists of FRP (fiber reinforced plastic), and forms a main member in the pressure withstanding structure. The fiber reinforced plastic layer 3 is completed by shaping the fibers (or fabric) impregnated with resin into that of the final product, and curing the resin.

The resin or plastic material that is used for the fiber reinforced plastic layer 3 typically consists of epoxy resin which has a high mechanical strength. When a thermal stability is desired, phenol resin may also be used. The fibers are required to have a high mechanical strength and a high elasticity, and typically consist of carbon, glass, silica or aromatic polyamide resin fibers. The fibers or the fabrics made from such fibers when impregnated with the afore-mentioned resin are called as prepreg.

The combining of the prepreg to the assembly of the plastic liner 2 and the mouth member 4 can be accomplished either by the filament winding method consisting of the winding of fibers in the form of prepreg around the assembly by using a winding machine and the hand layup method consisting of the layering of the woven fabric in the form of prepreg onto the outer surface of the assembly. The filament winding method is often preferred because of a high level of continuity in the fibers, a high mechanical strength and a suitability to be formed as a highly thin walled vessel.

The filament winding method may be based on a hoop winding or winding fibers circumferentially around the cylindrical part shown in FIG. 1, an in-line winding or winding fibers in the axial direction, or a helical winding or winding the fibers around the cylindrical part at an angle to the circumferential direction. The winding method, the number of turns and the winding angle can be selected depending on the stress condition of the pressure vessel 1 when subjected to the intended pressure load.

Upon completion of the shaping of the prepreg impregnated with thermoplastic resin such as epoxy resin, the intermediate assembly consisting of the plastic liner 2 and the mouth member 4 having the prepreg wrapped around it is placed in a curing chamber maintained at a prescribed temperature to cure the rein material. This completes the forming of the fiber reinforced resin layer 3, finishes the assembly as the final product.

Figure 2:
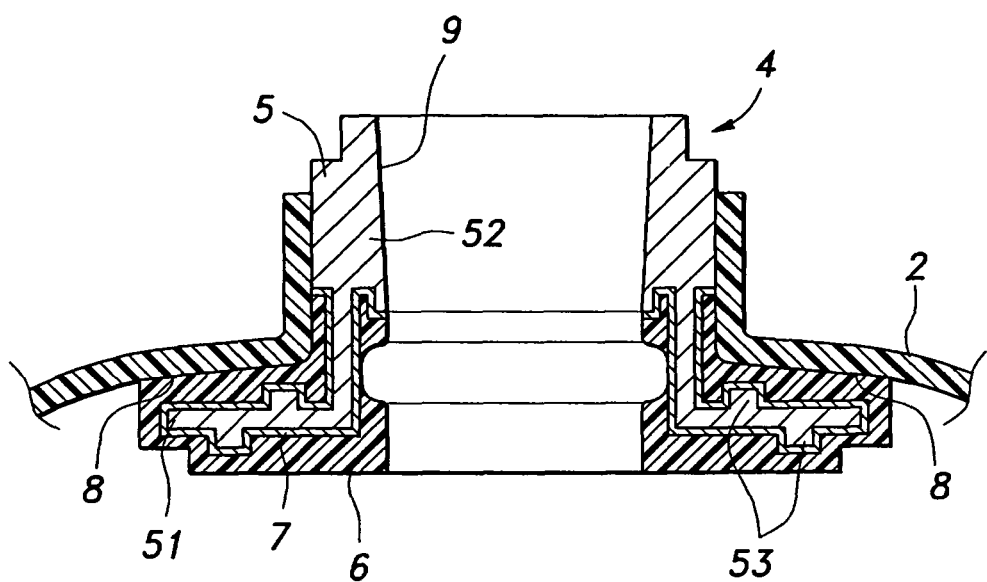
FIG. 2 is an enlarged sectional view of a part of FIG. 1 indicated by arrow II showing the state of bonding between a plastic liner and a mouth member in the pressure vessel embodying the present invention.

Referring to FIG. 2, the details of the mouth member 4 and the arrangement for joining the plastic liner 2 to the mouth member 4 are described in the following. The mouth member 4 comprises a metallic hat member 5 that includes an annular flange 51 and a tubular portion 52 extending outward (upward in FIG. 2) of the pressure vessel from the inner periphery of the annular flange 51, and a plastic bonding member 6 consisting of an annular member in which the flange 51 and a part of the tubular portion 52 are insert molded. The inner circumferential surface 9 of the mouth member 4 is configured to receive a valve or the like not shown in the drawings.

The hat member 5 is provided with a surface coating 7 formed by a powder coating method that uses a suitable bonding agent such as polyolefin resin as disclosed in Patent Document 3. Owing to the presence of the coating 7 consisting of a bonding agent layer formed by a powder coating method or the like, a favorable bonding between the metallic hat member 5 and the plastic bonding member 6 can be ensured.

The hat member 5 may consist of aluminum alloy, titanium alloy or any other material which is light in weight and provided with a high mechanical strength. Prior to performing the powder coating method on the hat member 5, it is desirable to roughen the surface of the hat member 5 by sand blasting, shot blasting, chemical surface processing or the like.

The material for the bonding member 6 can be selected depending on the substance that is to be received in the vessel and the condition under which the substance is filled into the vessel as the bonding member 6 forms a part of the vessel jointly with the plastic liner 2, and may consist of polyethylene (PE), high density polyethylene (HDPE), polyamide, polyketone or polyphenylene-sulfide (PPS). The material for the bonding member 6 preferably consists of the same material as the plastic liner 2 as the bonding member 6 is required to be welded to the plastic liner 2.

As discussed above, because the mouth member 4 consisting of the metallic hat member 5 and the plastic bonding member 6 is formed in advance, the bonding state of the mouth member 4 can be inspected as a separate member, and this allows any fault in the mouth member 4 can be detected during the manufacturing process, and the productivity can be improved. If desired, through holes may be formed in the flange 51 of the hat member 5 and/or ridges 53 or grooves may be formed in the flange 51 and/or the tubular portion 52 with the aim of preventing the rotation of the metallic hat member 5 with respect to the bonding member 6 or a self sealing property may be achieved between the metallic hat member 5 and the plastic bonding member 6. The "self sealing" property as used herein means the capability to seal the possible gap that may be formed between the ridges 53 when a high pressure is applied to the pressure vessel owing to a pressure gradient that would be produced around the ridges 53.

The plastic liner 2 and the mouth member 4 are joined to each other by the welding of the plastic liner 2 with the bonding member 6 at the bonding surface 8. If desired, the bonding between the hat member 5 and the plastic liner 2 may be improved by forming a coating with a powder coating process on the bonding surface of the hat member 5 for the plastic liner 2 and applying a bonding agent to the coating. The bonding agent that may be used for this purpose can be selected from any known bonding agent, but preferably consists of a thermoplastic bonding agent such as polyolefin bonding agent.

According to this arrangement, because the welding is performed between the plastic materials of the same kind, there is no difference in the thermal expansion or the deformation under high pressure loading between the plastic liner 2 and the mouth member 4, and a particularly favorable bonding can be achieved. As there is no need to form any complex features such as dovetails in the interface between the plastic liner 2 and the mouth member 4, there is no need to consider the flow of the molten plastic material during the molding process. In short, as the bonding interface between the two members can be adapted for a favorable welding result, the blow molding process is simplified, and the productivity can be improved.

Figure 3:
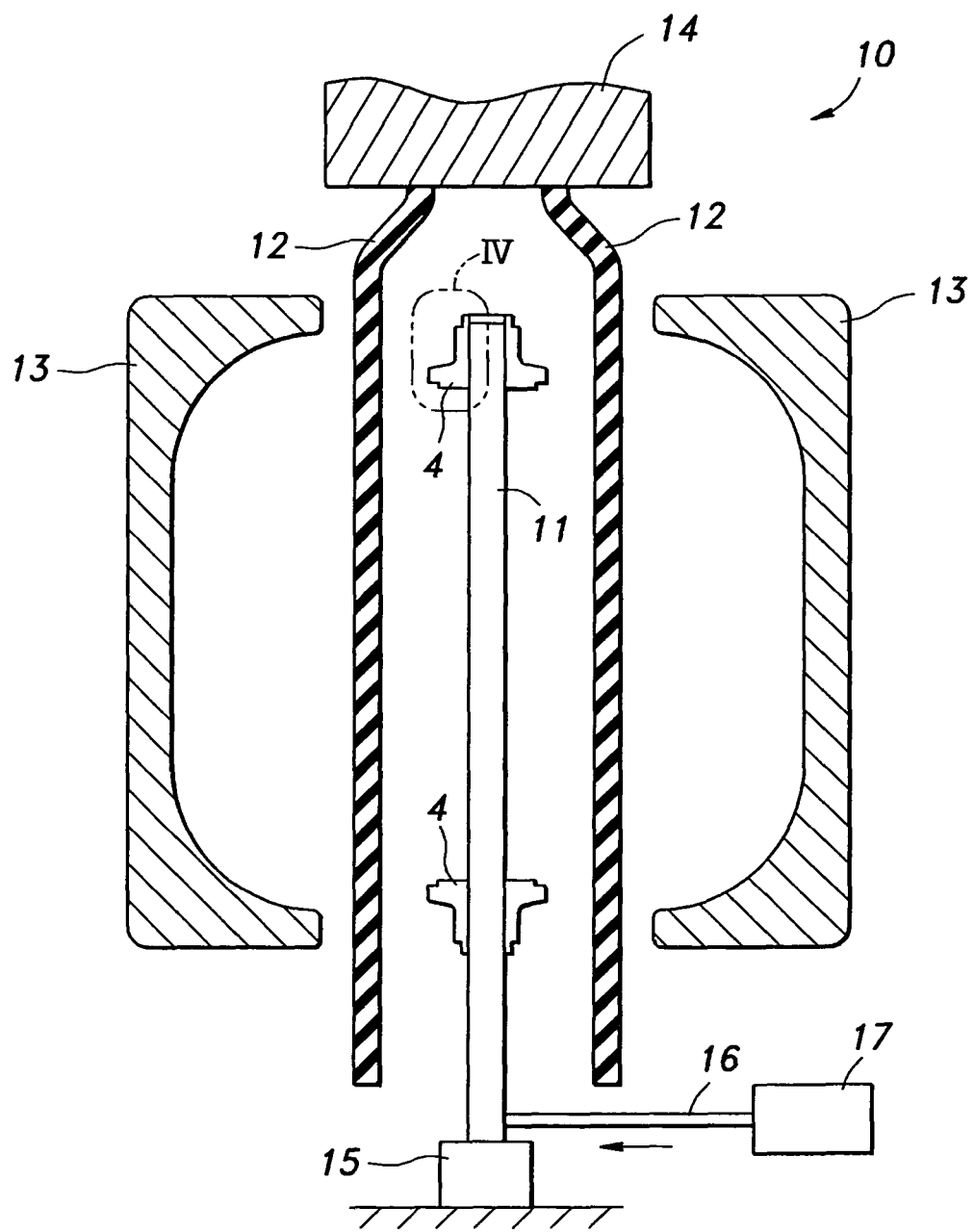
FIG. 3 is a schematic sectional diagram showing a blow molding process given as an example of a manufacturing process embodying the present invention.

An exemplary process of fabricating the pressure vessel 1 by using a blow molding process is described in the following with reference to FIG. 3. This process uses a blow molding device which includes a metallic die assembly 13, a blow pin 11 and a support table 15. In FIG. 3, two mouth members 4 are provided on the pressure vessel 1, one at the top and the other at the bottom of the pressure vessel 1, but the pressure vessel is not limited by this configuration, and may also be provided with only one mouth member at the top or at the bottom thereof.

The various steps of the fabrication process are described in the following. A hat member 5 having an annular flange 51 and a tubular portion 52 extending outward from the inner peripheral part of the annular flange 51 is prepared, and a coating 7 is formed on the surface of the hat member 5 by using a powder coating process. A plastic bonding member 6 having an annular shape is injection molded with the flange 51 of the hat member 5 and a part of the tubular portion 52 of the hat member 5 insert molded therein. The mouth member 4 is then fitted on the blow pin 11 by using an engagement structure which will be described hereinafter, and the blow pin 11 supporting the mouth member 4 is placed on the support table 15.

A tubular parison 12 which is to be formed into the plastic liner 2 is extruded from a nozzle 14, and the parison 12 hangs into the cavity of the die assembly 13 so as to surround the blow pin 11 supporting the mouth member 4. When the parison 12 has dropped to a prescribed position, the die assembly 13 is closed, and constricts a part of the parison 12 such that a mouth portion 2a (See FIG. 4) of the plastic liner 2 is formed, and the mouth member 4 along with the parison 12 is placed between the blow pin 11 and the inner surface of the die assembly 13 or, in other words, the mouth member 4 is inserted in the cavity of the die assembly 13. The blow pin 11 is provided with a communication passage and a communication port (air supply port, not shown in the drawings) for feeding air into the parison 12 from an air supply unit 17 via a duct 16 so that the air supplied by the air supply unit 17 is forced into the parison 12 which is enclosed within the die assembly 13.

The air that is forced into the parison 12 pushes the parison 12 against the inner surface of the die assembly 13, and shapes it into a hollow vessel conforming to the shape of the inner surface of the die assembly 13. At the same time, the bonding member 6 of the mouth member 4 is welded to the plastic liner 2 so that a vessel having the mouth member structure as shown in FIG. 2 is formed. In the present embodiment, the temperature of the bonding member 6 is raised by controlling the temperature of the air supplied from the air supply unit 17 to a prescribed level that allows a part of the bonding member 6 to be melted. Therefore, the welding of the plastic liner 2 with the mouth member 4 is accomplished in a reliable manner not only by relying on the latent heat of the parison 12 which is to be formed into the plastic liner 2 but also causing a part of the plastic material on the side of the mouth member 4 to be softened or melted.

The engagement structure between the mouth member 4 and the blow pin 11 is described in the following with reference to FIG. 4. The following description is directed to an example of the engagement structure based on the use of a quick joint coupler which uses a ball 22 and a release groove 20, but the engagement structure may also make use of other per se known arrangements. FIG. 4 shows only the engagement structure for the upper mouth member 4 shown in FIG. 3, but the lower mouth member 4 may also be provided with a structure similar to or symmetric to that for the upper mouth member 4.

A release groove 20 having a prescribed depth is formed circumferentially on the inner circumferential surface 9 of the mouth member 4. The blow pin 11 is provided with a longitudinal axial line extending vertically, and includes a large diameter tubular portion 26 defining the outer peripheral surface of the blow pin 11, and a small diameter tubular portion 23 slidably received in the large diameter tubular portion 26 in a vertically moveable manner. The large diameter tubular portion 26 is formed with a radial through hole 21 in a side wall thereof, and a ball 22 is received in the radial through hole 21, the ball 22 having an outer diameter that permits the ball 22 to move freely in the through hall 21 radially with respect to the blow pin 11. Although not shown in the drawings, the radially outer end of the through hole 21 is reduced in diameter so that the ball 22 may not be drop off radially outwardly out of the large diameter tubular member 26.

The outer surface of the small diameter tubular member 23 is provided with a large diameter portion 29 in a lower part thereof and a reduced diameter portion 24 in an upper end thereof such that the outer diameter of the small diameter tubular member 23 is progressively reduced from the large diameter portion 29 to the reduced diameter portion 24 via a tapered portion 28. The inner surface of the small diameter tubular member 23 is provided with a shoulder 27 at the boundary between the large diameter portion 29 and the reduced diameter portion 24. A spring 25 is provided inside the reduced diameter portion 24, and is engaged by the shoulder 27 so that the small diameter tubular member 23 is resiliently urged upward.

Figure 4A:
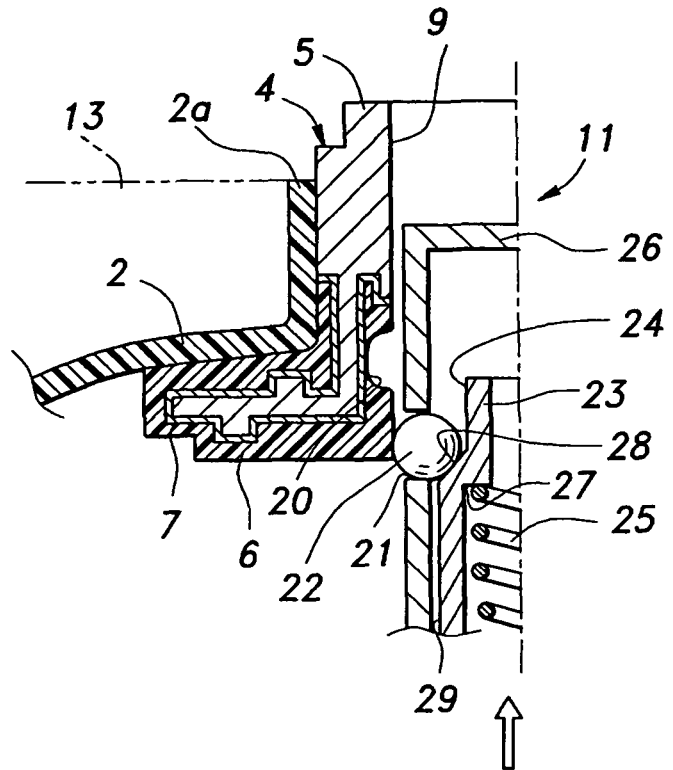
FIGS. 4a and 4b are detailed sectional views of a part of FIG. 3 indicated by arrow IV showing the state of engagement between the mouth member and a blow pin in the pressure vessel embodying the present invention.

The procedure for engaging the quick joint coupler of the illustrated embodiment is described in the following with reference to FIGS. 4a and 4b. As FIG. 4a is intended for the description as to how the blow pin 11 can be disengaged from the mouth member 4 as well as for the description as to how the blow pin 11 is engaged by the mouth member 4, the plastic liner 2 which is absent at the time of engaging the blow pin 11 to the mouth member 4 is shown in FIG. 4a. Suppose that the small diameter tubular member 23 is displaced downward with respect to the large diameter tubular member 26 such that the radially inward movement of the ball 22 is permitted as shown in FIG. 4a. When the blow pin 11 is moved upward into the bore defined by the inner surface 9 of the mouth member 4, the ball 22 is forced radially inward in the through hole 21 until the ball 22 is partly received in a space defined between the reduced diameter portion 24 and the large diameter tubular member 26.

Figure 4B:
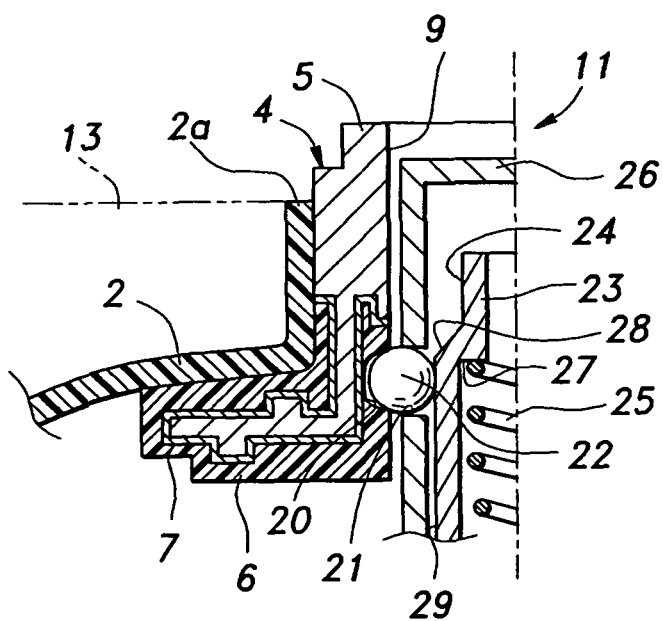

When the blow pin 11 is moved further upward until the ball 22 opposes the release groove 20, the ball 22 is allowed to move radially outward as shown in FIG. 4b. At this time, the ball 22 is urged outward by the tapered portion 28 of the small diameter tubular member 23 which is in turn resiliently urged upward by the spring 25 engaging the shoulder 27, and is eventually received in the release groove 20. Once the ball 22 is received in the release groove 20, the small diameter tubular member 23 is allowed to move further upward until the large diameter portion 29 prevents the radially inward movement of the ball 22 so that the mouth member 4 and the blow pin 11 are firmly engaged by each other.

When removing the blow pin 11, the small diameter tubular member 23 of the blow pin 11 is moved downward until a space is created in a radially inward part of the ball 22 owing to the small diameter portion 24 so that the ball 22 which has been received in the release groove 20 is once again allowed to move radially inward. As the small diameter tubular member 23 moves further downward, the ball 22 is caused to move radially inward and slides along the inner surface 9 so that the mouth member 4 is disengaged from the blow pin 11. According to the illustrated embodiment, the blow pin 11 can be easily removed in this manner.

A screw blow pin was used in the conventional blow molding process for the purpose of engaging the blow pin with the mouth member. According to this conventional arrangement, when removing the blow pin upon completion of each blow molding cycle, a rotational torque is applied to the mouth member, and this caused an adverse influence on the state of bonding between the mouth member and the plastic liner. As a result, it was necessary to watch out for reduction in bonding strength and creation of cracks in the bonding interface. According to the illustrated embodiment, by using the quick joint coupler for the engagement of the blow pin 11 with the mouth member 4, not only the removal of the blow pin 11 is simplified but also the bonding between the mouth member 4 and the plastic liner 2 is prevented from being compromised owing to the elimination of the torque that may be otherwise applied between them when removing the blow pin in the conventional arrangement.

Although the present invention has been described in terms of a preferred embodiment thereof, it is obvious to a person skilled in the art that various alterations and modifications are possible without departing from the scope of the present invention. For instance, the small diameter tubular member 23 was provided with a reduced diameter portion 24 in an upper end thereof, and was resiliently urged upward by the spring 25 in the illustrated embodiment, but it is also possible to provide a reduced diameter portion 24 in a lower end thereof, and resiliently urge the small diameter tubular member 23 downward by using a spring. Only a single release groove 20 was formed on the inner surface 9 of the mouth member 4 in the illustrated embodiment, but it is also possible to provide a plurality of recesses in positions corresponding to the through hole 21. Such recesses may have a bottom (a closed end) or may not have a bottom (or may consist of through holes) without departing from the spirit of the present invention.

GLOSSARY 1 pressure vessel
2 plastic liner
2a mouth
3 fiber reinforced plastic layer
4 mouth member
5 hat member
6 bonding member
7 coating
8 bonding surface
9 inner circumferential surface
10 blow molding device
11 blow pin
12 parison
13 die assembly
14 nozzle
15 support table
16 duct
17 air supply unit
20 release groove
21 through hole
22 ball
23 small diameter tubular member
24 reduced diameter portion
25 spring (biasing means)
26 large diameter tubular member
27 shoulder (small diameter tubular member)
28 tapered portion (small diameter tubular member)
29 large diameter portion (small diameter tubular member)
51 flange
52 tubular portion
53 ridge

The invention claimed is:

1. An engagement structure including a mouth member of a pressure vessel and a blow pin, configured such that a parison is placed around the mouth member with the blow pin received in the mouth member, and is blow molded by using a die assembly surrounding the parison so that a plastic liner of a pressure vessel is formed along a die surface of the die assembly as a vessel-like structure, the engagement structure comprising:
   a through hole passed through a peripheral wall of the blow pin;
   a ball received in the through hole so as to be moveable in a radial direction; and
   a recess formed in an inner circumferential surface of the mouth member;
   wherein when the blow pin is received in the mouth member so as to cause the ball to oppose the recess, the mouth member and the blow pin are capable of being engaged with each other by the ball moving radially outward until a part of the ball is received in the recess.

2. The engagement structure according to claim 1, wherein the engagement structure further comprises:
   a large diameter tubular member having a vertically extending axial line and defining the peripheral wall of the blow pin;
   a small diameter tubular member received in the large diameter tubular member in a vertically moveable manner; and
   a biasing means for resiliently urging the small diameter tubular member in a first axial direction;
   wherein an outer periphery of the small diameter tubular member includes a large diameter portion formed on a side of a second axial direction thereof, the second axial direction being opposite to the first axial direction, and a reduced diameter portion formed on a side of the first axial direction thereof and connected to the large diameter portion via a tapered portion so that a movement of the small diameter tubular member in the second axial direction allows a radially inward movement of the ball, and a movement of the small diameter tubular member in the first axial direction with the ball located in a radially inward position causes the ball to move radially outward owing to an engagement with the tapered portion, the large diameter portion, when disposed to oppose the ball, preventing a radially inward movement of the ball from a radially outward position thereof.

3. The engagement structure according to claim 1, wherein the mouth member comprises a metallic hat member including an annular flange and a tubular portion extending axially outward from an inner peripheral part of the flange and a plastic bonding member insert molded around the flange and a part of the tubular portion into an annular shape, the plastic liner and the bonding member being bonded to each other as the plastic liner is blow molded with the mouth member inserted therein.

4. The engagement structure according to claim 3, wherein a powder coating is applied to a surface of the metallic hat member.

5. The engagement structure according to claim 2, wherein the mouth member comprises a metallic hat member including an annular flange and a tubular portion extending axially outward from an inner peripheral part of the flange and a plastic bonding member insert molded around the flange and a part of the tubular portion into an annular shape, the plastic liner and the bonding member being bonded to each other as the plastic liner is blow molded with the mouth member inserted therein.

6. The engagement structure according to claim 5, wherein a powder coating is applied to a surface of the metallic hat member.

* * * * *